(12) United States Patent
Matraszek et al.

(10) Patent No.: US 8,036,467 B2
(45) Date of Patent: Oct. 11, 2011

(54) METHOD FOR CREATING AND USING AFFECTIVE INFORMATION IN A DIGITAL IMAGING SYSTEM

(75) Inventors: Tomasz A. Matraszek, Pittsford, NY (US); Elena A. Fedorovskaya, Pittsford, NY (US); Serguei Endrikhovski, Rochester, NY (US); Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/541,224

(22) Filed: Aug. 14, 2009

(65) Prior Publication Data

US 2009/0297065 A1 Dec. 3, 2009

Related U.S. Application Data

(60) Division of application No. 11/456,620, filed on Jul. 11, 2006, now Pat. No. 7,620,270, which is a continuation of application No. 10/036,113, filed on Dec. 26, 2001, now abandoned.

(51) Int. Cl.
*G06K 9/62* (2006.01)

(52) U.S. Cl. ..................... 382/224; 348/231.2

(58) Field of Classification Search ............... 348/231.2, 348/231.3, 715, E5.016, E5.007; 382/224; 707/E17.095, E17.102, E17.118; 715/255, 715/745, 807
See application file for complete search history.

(56) References Cited

U.S. PATENT DOCUMENTS

| | | |
|---|---|---|
| 5,019,975 A | 5/1991 | Mukai |
| 5,550,646 A | 8/1996 | Hassan et al. |
| 5,666,215 A | 9/1997 | Fredlund et al. |
| 5,760,917 A | 6/1998 | Sheridan |
| 5,802,220 A | 9/1998 | Black et al. |
| 5,832,464 A | 11/1998 | Houvener et al. |
| 6,004,061 A | 12/1999 | Manico et al. |
| 6,154,772 A | 11/2000 | Dunn et al. |
| 6,182,133 B1 | 1/2001 | Horvitz |
| 6,241,668 B1 | 6/2001 | Herzog |
| 6,629,104 B1 * | 9/2003 | Parulski et al. ............... 382/307 |
| 6,721,952 B1 | 4/2004 | Guedalia et al. |
| 2001/0041020 A1 * | 11/2001 | Shaffer et al. .................. 382/305 |
| 2001/0046330 A1 * | 11/2001 | Shaffer et al. .................. 382/284 |
| 2002/0049738 A1 * | 4/2002 | Epstein ............................ 707/1 |
| 2002/0055955 A1 * | 5/2002 | Lloyd-Jones et al. ......... 707/512 |
| 2003/0009469 A1 * | 1/2003 | Platt et al. ...................... 707/100 |
| 2007/0150389 A1 | 6/2007 | Aamodt et al. |

OTHER PUBLICATIONS

"The Sentic Mouse: Developing a tool for Measuring Emotional Valence", by Dana Kirsch, May 1997, XP-002437625.
"Emotion Recognition in Human-Computer Interaction", by R. Cowie et al., IEEE Signal Processing Magazine, vol. 18, No. 1, Jan. 2001, pp. 32-80, XP-011089882.
"Digital Still Camera Image File Format Standard (Exchangeable image file format for digital still camras: Exif)", Version 2.1, Jun. 12, 1998, XP-002224029.
R. W. Picard, Affective Computing, Online, 1995, XP002351025.

(Continued)

*Primary Examiner* — Gregory F Cunningham
(74) *Attorney, Agent, or Firm* — Raymond L. Owens; Eugene I. Shkurko

(57) ABSTRACT

An image file for storing a still digital image and metadata related to the still digital image, the image file including digital image data representing the still digital image, and metadata that categorizes the still digital image as an important digital image, wherein the categorization uses a range of levels and the range of levels includes at least three different integer values.

8 Claims, 10 Drawing Sheets

OTHER PUBLICATIONS

R. W. Picard et al., Modeling User Subjectivity in Image Libraries, Proceedings Internation Conference on Image Processing, vol. 2, 1996, pp. 777-780, XP002351026.

R. W. Picard et al., Affective Wearables, IEEE Comput. Soc., Oct. 13, 1997, pp. 90-97, XP010251547.

R. W. Picard et al., Affective Intelligence—The Missing Link?, BT Technology Journal, vol. 14, No. 4, Oct. 1997, pp. 150-160, XP-000722041.

R. W. Picard, Building HAL: Computers That Sense, Recognize, and Respond to Human Emotion, Proceedings of the SPIE—The International Society for Optical Engineering, vol. 4299, 2001, pp. 518-523, XP002351027.

R. W. Picard et al., Toward Machine Emotional Intelligence: Analysis of Affective Physiological State, IEEE Transactions on Pattern Analysis and Machine Intelligence, vol. 23 No. 10, Oct. 2001, pp. 1175-1191, XP002268746.

Rob Roy, DVD From Hollywood Video Rentals, SSBN 0-7928-3366-X, Metro Goldwyn Mayer (MGM) @ 1995.

Dillon et al, Aroused and Immersed: The Psychophysiology of Presence, Goldsmiths College, Universityof London, 2000.

"Looking at Pictures: Affective, facial, visceral, and behavorial reactions", by Peter J. Lang et al, Psychophysiology, 30 (1993), 261-273.

"FotoFile: A Consumer Multimedia Organization and Retrieval System", by Allan Kuchinsky, Celine Pering, Michael L. Creech, Dennis Freeze, Bill Serra, Jacek Gwizdka*, Hewlett Packard Laboratories, 1501 Page Mill Road, Palo Alto, CA 94304 USA.

"Facial Expression Recognition using a Dynamic Model and Motion Energy", by Irfan Essa et al. MIT Media Laboratory Perceptual Computing Section Technical Report No. 307, pp. 1-8.

* cited by examiner

THESE SIGNALS ARE GOING TO BE RECORDED FOR DETERMINING
YOUR PSYCHOLOGICAL REACTION TO IMAGES

- [V] VIEWING TIME
- [V] FACIAL EXPRESSION / HEAD MOVEMENTS
- [V] PHYSIOLOGY
- [ ] AUDIO
- [ ] GAZE TRACKING
- [ ] TOUCH PRESSURE

FIG. 3A

THESE SIGNALS ARE GOING TO BE RECORDED FOR DETERMINING
YOUR PSYCHOLOGICAL REACTION TO IMAGES

- [V] VIEWING TIME
- [V] FACIAL EXPRESSION / HEAD MOVEMENTS
- [V] PHYSIOLOGY
  - [V] HEART RATE
  - [V] GSR
  - [V] TEMPERATURE
  - [ ] EEG
- [ ] AUDIO
- [ ] GAZE TRACKING
- [ ] TOUCH PRESSURE

FIG. 3B

| Personal Affective Tag field - PAT |
|---|
| Personal Identification field – PID_1 |
| Affective Record Start field – BEGIN_RECORD_1 |
| Date field – DATE |
| Location field – LOCATION |
| Affect field – AFFECT |
| Viewing time field – VIEWING_TIME |
| Physiology GSR field – GSR_SIGNAL |
| Physiology Temperature field – TEMP_SIGNAL |
| Ambient Temperature – AMBIENT_TEMP_SIGNAL |
| Physiology Heart Rate field – HR_SIGNAL |
| Face Expression field – FACE_EXPRESSION_DATA |
| Affective Record Start field – BEGIN_RECORD_2 |
| Date field - DATE |
| Location field – LOCATION |
| Affect field – AFFECT |
| Viewing time field – VIEWING_TIME |
| Physiology GSR field – GSR_SIGNAL |
| Physiology Temperature field – TEMP_SIGNAL |
| Physiology Heart Rate field – HR_SIGNAL |
| Physiology EEG field – EEG_SIGNAL |
| Face Expression field – FACE_EXPRESSION_DATA |
| Gaze tracking field – GAZE_TRACKING_DATA |
| Behavior Record Start field – BEGIN_RECORD_3 |
| Number of times viewed field – VIEWING_COUNTER |
| Number of times printed field – PRINTING_COUNTER |
| Number of times sent in e-mail field – E_MAIL_COUNTER |

*FIG. 4A*

| Personal Affective Tag 1 |
|---|
| Personal Identification = User 1 |
| Date = Aug 1, 2000 |
| Importance = 8................ |
| |
| Personal Affective Tag 2 |
| Personal Identification = User 2 |
| Date = July 4, 2001 |
| Importance = 4................ |
| |
| Personal Affective Tag 3 |
| Personal Identification = User 1 |
| Date = Oct 8, 2001 |
| Importance = -5................ |

*FIG. 4B*

METHOD FOR CREATING AND USING AFFECTIVE INFORMATION IN A DIGITAL IMAGING SYSTEM

CROSS REFERENCE TO RELATED APPLICATIONS

This application is a divisional of U.S. Ser. No. 11/456,620 filed Jul. 11, 2006 now U.S. Pat. No. 7,620,270, entitled "Method for Creating and Using Affective Information in a Digital Imaging System" by Tomasz A. Matraszek et al. which is a continuation of U.S. patent application Ser. No. 10/036,113, filed Dec. 26, 2001 now abandoned entitled "Method for Creating and Using Affective Information in a Digital Imaging System" by Tomasz A. Matraszek et al. each of which is incorporated herein by reference in its entirety.

FIELD OF THE INVENTION

The present invention relates to systems that retrieve digital images and, more particularly, to systems that retrieve digital images based upon affective information.

BACKGROUND OF THE INVENTION

Digital images, from digital cameras or scanned photographic film, can be viewed, stored, retrieved, and printed using a home computer, or can be uploaded to a web site for viewing, as described in commonly assigned U.S. Pat. No. 5,666,215 to Fredlund et al., the disclosure of which is incorporated herein by reference. Using a web browser, a group of these digital images can be viewed and selected for printing, for example using the Kodak Photonet Service. The user can select the size of each print to be produced, and the quantity of prints to be made from each image.

Images can be organized into categories according to the people, places, subjects or events depicted, as described in a paper entitled "FotoFile: A Consumer Multimedia Organization and Retrieval System" by Kuchinsky et al. This paper describes metadata attributes that are used to describe certain images, including a "favorite" attribute that is used to indicate the "best" images in a user's collection. However, in this paper, the "favorite" attribute can only be used to help retrieve one user's images on their own PC, since there is nothing in the "favorite" attribute to designate which user has indicated that this is a "favorite" image. If the PC is used by more that one user, the FotoFile system is unable to distinguish which user labeled the image as a "favorite". Furthermore, the favorite attribute is stored in a database separate from the digital image files. Therefore, when the digital image files are used on a different system, for example when the images are transferred via a CD-R or other media, or are uploaded to an on-line photo service provider, the favorite attribute information is no longer available.

Various types of metadata related to images have been standardized. For example, the International Organization for Standardization (ISO) group ISO/IEC JTC1/SC29/WG11, "Coding of Moving Pictures and Audio", has developed an "MPEG-7 Requirements Document" V.8, No. N2727, March 1999, which defines various types of metadata that can be stored with moving images. Also, the Digital Imaging Group (DIG) has developed the DIG35 metadata standard. However, neither of these specifications defines metadata, which indicates that an image is a favorite image for a particular user.

Album pages can be produced from digital images by arranging numerous images on the same page, as described in commonly assigned U.S. Pat. No. 6,004,061 to Manico et al., the disclosure of which is incorporated herein by reference. These album pages can be customized in terms of the size and arrangement of images on the page, the size and finish of the album pages, and the background color or patterns used. The method of organizing digital images on an album page is described in U.S. patent application Ser. No. 09/559,478, filed Apr. 27, 2000 by Simon, the disclosure of which is incorporated herein by reference. However, this method does not enable a user's favorite images to be automatically featured, for example by making them larger or more prominent, unless the user manually intervenes and manually adjusts their images.

SUMMARY OF THE INVENTION

It is an object of the present invention to make use of affective information related to a user's reaction to an image to classify such image based upon such reaction.

This object is achieved by an image file for storing a still digital image and metadata related to the still digital image, the image file comprising:

a) digital image data representing the still digital image; and b) metadata that categorizes the still digital image as an important digital image, wherein the categorization uses a range of levels and the range of levels includes at least three different integer values.

It is an advantage of the present invention to make use of affective information to classify a user's reaction to digital images.

It is an additional advantage of the present invention that a user's reaction can be manually input by the user, using a mouse, keypad, or speech recognition, or can be automatically determined by one or more determining how long a given image was viewed by the user, by the user's facial expression or gaze, or by measuring the user's physiology.

It is a further advantage of the present invention that affective information is associated with a user identifier which defines which user's reaction is provided by the affective information.

It is a further advantage of the present invention to associate affective information for multiple users with the same digital image.

BRIEF DESCRIPTION OF THE DRAWINGS

FIG. 3A and FIG. 3B depict a user interface for selecting signal recordings for creating affective information;

FIG. 4A is an example of a personal affective tag for a single user;

FIG. 4B is an example of affective metadata for multiple users with multiple personal affective tags;

DETAILED DESCRIPTION OF THE INVENTION

Figure 1:
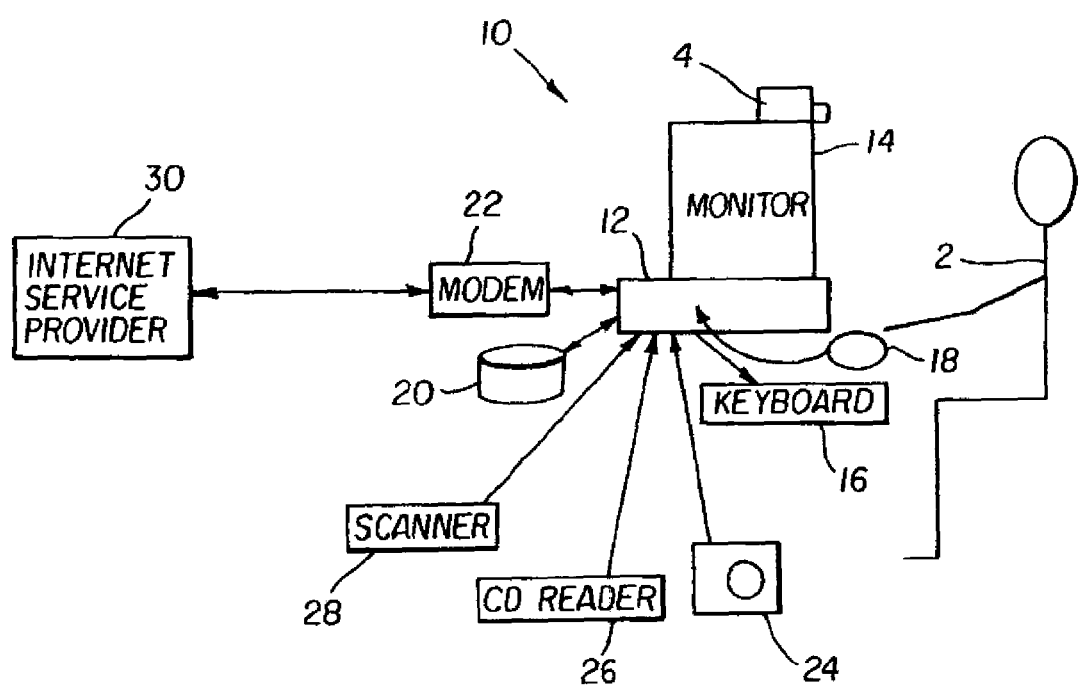
FIG. 1 depicts a block diagram of a home computer system for creating affective information.

The present invention defines methods for determining affective information related to images, for storing affective information and user identifiers in association with digital images, and for using the affective information and user identifiers in retrieving digital images and in producing hardcopy output, such as album pages. The present invention associates the emotional reactions of different people to the same images. When used with networked photosystems, this enables people to share and to use images in more personal ways. By storing affective information and user identifiers in a standard manner, it is possible to automatically create imaging products, such as album pages, which have been personalized using the affective information for a particular user.

Affective information is defined in this patent as information that relates to the feelings or emotions of a person toward images. This information usually describes or represents a person's subjective reaction to a given image. The image could be a still image, or a moving image such as a video clip. Affective information can indicate the level of importance a user associates with an image, such as whether the image is a "favorite". For example, a user may take dozens of photographs during an event, such as a wedding or Christmas celebration. Out of these many images, there a normally a few that the user feels are special favorites. Affective information can also include emotional categories, such as fear, anger, happiness, etc.

A simple example of affective information is a "tag" or "flag", associated with an image, which indicates whether or not the image has been identified as a "favorite" or "important" image for the user. The absence of such a tag indicates that the image has not been identified as a favorite or important image for the user. Such tag represents a binary categorization, classifying images into "favorite" and "normal" categories. In another example, favorite images are categorized into a range of levels. For example, images can be classified between a range of −10 to +10, where 0 is used for an unclassified image, +10 is used for the "most favorite" image or images, and −10 is used for the "least favorite" image or images.

The present invention recognizes that different users have different emotional reactions to the same image. Therefore, to be useful, affective information relating to images must be associated with a particular user. This can be done by providing a user identifier along with the affective information. The user identifier can be any type of information that enables a particular user to be identified. The user identifier can be a personal identification code such as a globally unique ID (GUID), user number, social security number, or the like. The user identifier can also be a complete legal name, a nickname, a computer user name, or the like. The user identifier can alternatively includes information such as a facial image or description, fingerprint image or description, retina scan, or the like.

The present invention recognizes that a user's emotional reaction to a particular image can change over time. For example, a user may have a favorite photo of one of their adult children and their spouse, taken at a family gathering. Some time later, the couple may divorce. At this later time, the image is no longer the same type of favorite photo, providing the user with happy memories. Instead, it may now be a "disliked" photo, which makes the user sad or angry. Therefore, in some embodiments of the present invention, a date or time period is associated with the affective information. In addition, affective information for the same user, provided at different dates or time periods, can be associated with the image. This history of a user's reaction to a given image also enables analysis of changes in person's reaction that can be used for therapeutic, diagnosis or retrospective purposes.

Affective information can be manually entered by a user, for example using a mouse, keyboard, or voice recognition, or can be collected automatically.

The following are examples of methods for automatically collecting affective information:

the viewing time of the image, since a longer viewing time normally indicates that this is an important image;

other behavioral/usage information related to the usage of this image, such as how many times the image was printed or sent to others via e-mail;

the facial expression of the user, which can be captured automatically by a video camera as the user views the image;

body gestures recorded by a video camera as the user views the image;

the user's eye movements, such as the gaze path of the user while viewing the image;

the user's voice, recorded while viewing the image;

the pressure of the user's hand on the input device (e.g. joystick or mouse) recorded while viewing the image; and the user's biometric or physiological responses recorded as the user views the image. These can be any combination of signals, including EMG, temperature, GSR, heart rate, brain waves EEG, brain-imaging signals, etc.

The following are examples of methods for a user to manually provide affective information:

having the user "click" a mouse on an icon representing a "favorite image" tag;

having the user type in a keyword, or select a keyword from a group of keywords, describing a subjective reaction (e.g. funny, sad, etc.) to an image; and having the user annotate the image with a voice recording (e.g. with phrases like "This is my favorite image").

Affective information is typically determined, either manually or automatically, as a user views images in their home, for example on their home computer. Affective tagging is defined as the process of determining affective information, and storing the affective information in association with the images. When the affective information is stored in association with a user identifier, it is known as "personal affective information". The affective information and user identifier are types of image "metadata", which is a term used for any information relating to an image. Examples of other types of image metadata include image capture time, capture device, capture location, date of capture, image capture parameters, image editing history, etc.

The personal affective information can be associated with a digital image by storing the personal affective information within the image file, for example using a TIFF IFD within an Exif image file. Alternatively, the personal affective information can be stored in a separate database. In some embodiments, this information is stored along with security and access permissions information, to prevent unauthorized access to the information.

Referring to FIG. 1, there is illustrated a desktop computer system made in accordance with the present invention for providing personal affective information, associating it with image(s) as image metadata, and storing the images and the associated personal affective information. The personal affective information is then used to provide improved image retrieval, and to provide customized photoproducts.

The system depicted in FIG. 1 includes a home computer 10 (with associated peripherals) located at the user location (e.g. their home). It is understood that a system such as a game console, dedicated Internet appliance, set top box, or retail kiosk may be substituted for the home computer system 10. The home computer 10 is connected through a modem 22 or other communications interface to a communication service provider, such as an Internet service provider 30. The home computer 10 includes a CPU motherboard 12, a display monitor 14, and a hard drive storage device 20 that can store high resolution image files such as digital still or digital motion images and associated metadata. The metadata includes personal affective information as well as other metadata, for example audio information associated with particular images.

The home computer includes various image input peripherals, including a scanner 28, a CD reader 26, and a digital camera 24. The scanner 28 is used to scan prints or film and produce digital images. The CD reader 26 is used to input digital images from a CD-R disc, such as a Kodak PictureCD (not shown). The user can also download images from a Service Provider using the modem 22. The home computer 10 can also connect to a local printer (not shown), such as an inkjet printer, to allow images to be printed at the user's home.

The digital camera 24 can be a digital still camera such as the Kodak DC 4800 digital camera manufactured by Eastman Kodak Company, Rochester N.Y. Alternatively, the digital camera 24 can be a digital motion camera such as the Kodak MC3 portable multimedia device, which records motion and sound video files, in addition to still images. The digital camera 24 connects to the home computer 10 via a cable employing a common interface, such as the well known Universal Serial Bus (USB) interface or the IEEE 1394 interface. Alternatively, digital camera 24 can connect to the home computer 10 using a wireless interface, such as the well known Bluetooth interface or the IEEE Standard 802.15 interface. Alternatively, the images can be transferred from the digital camera 24 to the home computer 10 using a removable memory card, such as a CompactFlash card and a card reader (not shown).

In order to provide affective information, the home computer 10 is connected to a keyboard 16 and a pointing device 18, such as a mouse or trackball. In a preferred embodiment, the pointing device 18 also includes sensors that can detect the user's physiological signals, including the GSR (Galvanic Skin Response), hand temperature and heart rate. The sensors also detect ambient temperature.

The home computer 10 is optionally connected to video camera 4. The video camera captures video images of the face of the user 2, and stores this video information on the hard drive storage 20. The video camera 4 can be, for example, a DV325 tethered camera sold by Eastman Kodak Company. The camera connects to the home computer 10 via a cable employing a common interface, such as the Universal Serial Bus (USB) interface.

The home computer 10 is provided with appropriate software for creating and using personalized affective information in accordance with the present invention. This software is typically stored on hard drive 20, and provided using a CD-ROM disc (not shown) which can be read by CD reader 26, or can be provided on a floppy disk (not shown) which is loaded into the home computer 10 via a floppy disk drive (not shown). Alternatively, this software can be downloaded from the Internet via modem 22.

Figure 8:
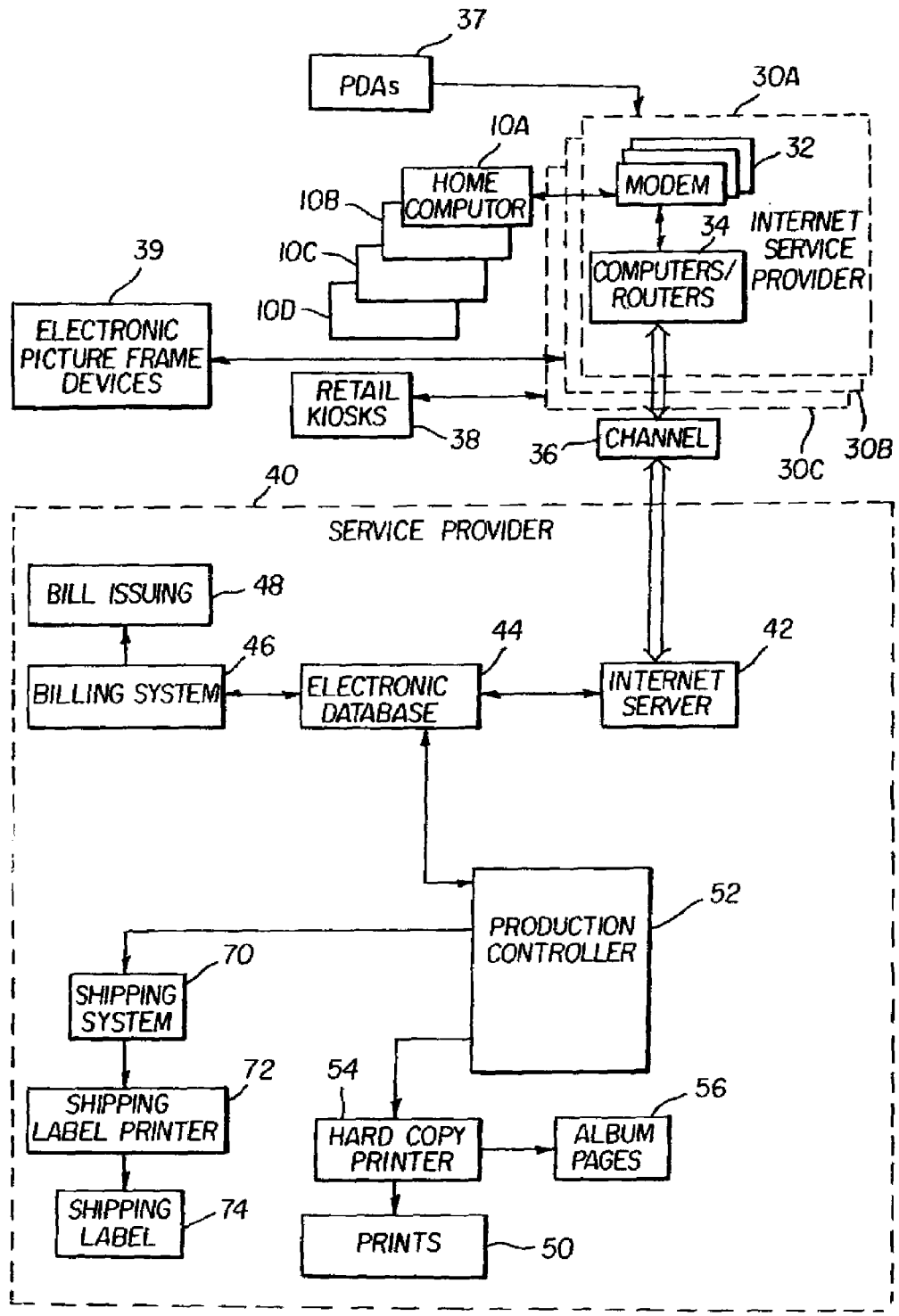
FIG. 8 depicts a block diagram of a networked digital system that uses affective information.

The home computer 10 is connected to a network, such as the Internet, as shown in FIG. 8. As depicted in FIG. 8, many different home computers 10A, 10B, 10C, and 10D are connected to the Internet by various Internet service providers (ISPs) 30A, 30B, and 30C. The ISPs provide a connection to a service provider 40. The ISP 30A-C includes banks of modems 32, one of which is connected to communicate with the modem 22 of the user's computer 10. The modem 32, in turn, communicates with computers/routers 34 in order to provide a connection to the channel 36 using equipment and techniques well known to those skilled in the art.

The service provider 40 is connected to the channel 36, such as the Internet, by a network server 42, such as an Internet server, which is comprised of one or more computers and associated peripherals. The service provider 40 also includes an electronic database 44. The electronic database 44 provides information describing numerous image bearing product options, including different print sizes, different output formats such as mugs and t-shirts, and printing a group of digital images onto album pages. The electronic database 44 can be contained on the same computer as the network server 42, or can utilize a separate computer, or can be distributed over several computers at the same physical site, or at different sites.

As shown in FIG. 8, the electronic database 44 is connected to production controller 52. The production controller 52 controls one or more color hardcopy printers 54, which can produce album pages 56 or separate hardcopy prints 58, which are examples of photoproducts. The production controller 52 can optionally be connected to a transfer printer (not shown) for producing transfer prints that can be used to produce t-shirts, coffee mugs, etc. incorporating one or more images uploaded by the user. The production controller 52 also controls a shipping system 70, which controls a shipping label printer 72 to produce a shipping label 74. The shipping label 74 is attached to a shipping container (e.g., a cardboard box containing packing material) that contains and protects the photoproducts during shipment (e.g., via air express mail, ground carrier, etc.) to the customer or the customer's designee.

On a regular basis (e.g. monthly) or alternatively whenever a photoproduct is purchased by the user, the electronic database 44 communicates with a billing system 46 to verify that the payment identifier (e.g., credit card or debit card number) provided by the customer is valid, and to debit the account for any purchases made, or for any monthly service fees for providing services to the user, such as for storing user images and associated personal affective information. As shown in block 48, the bill is issued. The customer's account that is debited can, of course, be located at a remote financial institution.

The service provider 40 is located at a second location, typically in another city, remote from the user's computer 10. The various portions of the service provider 40 can be located in a single building or complex of adjacent buildings, or can be geographically dispersed over several sites in different cities or even different continents. For example, the electronic database 44 and the album production controller 52 can be provided by computers located in different cities and interconnected via a suitable digital communications network, such as the Internet. Furthermore, the electronic database 44 can itself be distributed over several computers in several different locations.

The electronic database 44 also provides long-term storage of the uploaded images and associated personal affective information. In this embodiment, stored images are accessible (e.g. viewable) via the Internet by authorized users, as described, for example, in commonly assigned U.S. Pat. No. 5,760,917 to Sheridan, the disclosure of which is herein incorporated by reference.

The electronic database 44 includes information describing different features of the albums and other photoproducts that can be selected and customized by the customer at the remote location, using the customer's computer 10. The electronic database 44 also includes information describing photoproduct options, for example album features such as providing various background colors or textures, page numbers, page captions, image captions, etc. The album pages can be bound in a cover, or can include holes to permit the pages to be inserted into a standard binder, such as a three-ring binder. These album feature options can be demonstrated via software programs, for example, JAVA applets, MPEG or QuickTime movies, or Shockwave files, which depict the functionality of features that the customer can choose.

In addition to home computers 10A-10D, other types of devices can be used to provide or access images via channel 36. These devices include Wireless PDA devices 37, retail kiosks 38, and electronic picture frame devices 39, all of which can be used to retrieve images and associated affective information from database 44 through channel 36 via one of the ISPs 30A-C.

Figure 2:
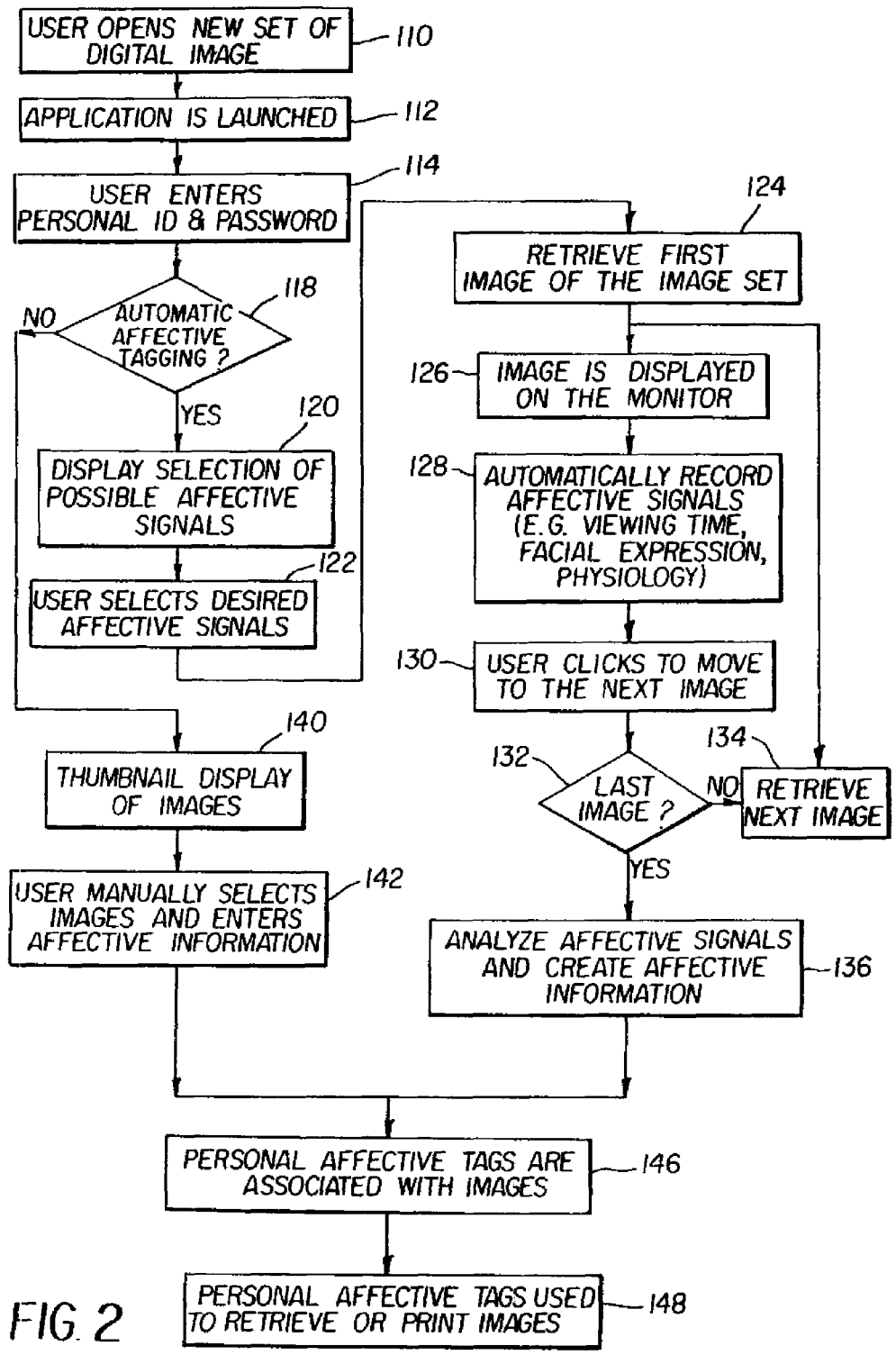
FIG. 2 is a flow diagram showing an embodiment of a system for creating affective information.

Referring to FIG. 2, there is shown a flow diagram illustrating embodiments of the present invention, implemented in the system described in relation to FIG. 1 and FIG. 8. This embodiment includes both automatic and manual determination of affective information.

In block 110, a user opens a new set of images by inserting the CD-ROM into the CD reader 26 of the home computer 10. In a preferred embodiment, the CD-ROM also includes the software application that implements the method of FIG. 2. In this case, the software is automatically installed as part of block 112, if necessary, so that it can be used by CPU motherboard 12.

In block 112, the application which implements the method of the present invention is launched automatically, when the images are viewed for the first time by a user. Alternatively, the user can start the application manually and load a new set of images from the digital camera 24, the scanner 28, or from other image sources including the Internet.

In block 114, the user enters their personal ID and password. Alternatively, this step can be provided automatically by the operating system of the home computer 10 when the user "logs on" to the computer. In an alternative embodiment, the video camera 4 is used in conjunction with face recognition software to automatically determine the user, and provide an appropriate user identifier, such as their name or personal identification code.

In block 118, the home computer 10 asks the user whether the user wants to manually provide affective information, or instead have the system automatically provide affective tagging while the user views the images.

In block 120, if the user selects automatic affective tagging, the home computer 10 provides a selection of signals that can be recorded in order to determine the user's emotional reaction as they view images. An example of a screen displayed on monitor 14 to enable this user selection is shown in FIG. 3A. Three signals are marked as defaults: viewing time per image, the facial expression recorded by the video camera 4, and physiological signals detected through sensors in pointing device 18. Depending on the hardware configuration, other signals may be listed in the selection.

In block 122, the user selects which signals are to be recorded in order to determine the affective information. In FIG. 3B, there is shown an example of signals selected by the user, including viewing time, facial expression, and physiology. The physiological signals selected by the user include heart rate, hand temperature, and galvanic skin response (GSR).

In block 124, the home computer 10 retrieves the first image from the CD-ROM (or other image source) and in block 126, the home computer 10 displays the image on the monitor 14.

In block 128, the home computer 10 automatically records the signals that the user selected in block 122 (e.g. the viewing time, a video of the user's face, and physiological signals).

In block 130, the user clicks the pointing device 18 to indicate that they want to move to the next image. Alternatively, the user can provide some other form of input, such as hitting a key on the keyboard 16, providing an audio command which is input by a microphone (not shown), providing a gesture captured by video camera 4, or using other input devices.

In block 132, the home computer 10 determines if this is the last image of the image set.

In block 134, if this is not the last image, the home computer 10 retrieves the next image of the image set and repeats blocks 126 through 132.

In block 136, if this is the last image, the home computer 10 analyzes the recorded affective signals in order to create affective information and creates affective tag. This step includes determining the degree of emotional importance of each image of the set, for the user 2. In a preferred embodiment, the home computer 10 estimates the emotional positive importance of each image of the set based on the user's facial expression (e.g. smiling), viewing time, and skin conductance.

The home computer 10 can detect the facial expression recorded by the video camera 4 using well known facial expression detection algorithms. An example of one such algorithm is "Facial Expression Recognition using a Dynamic Model and Motion Energy" by Irfan A. Essa and Alex Pentland published in the Proceedings of the ICCV 95, Cambridge, Mass., June 1995. A detected smile is a positive facial expression.

In block 128, the facial expression of the user 2 was recorded as the user viewed the set of images. Frames of the video signal from the video camera 4 are then processed using facial expression recognition software, and classified into at least two categories: positive and not positive. The positive category is assigned when the smile is detected on the user's face. The not positive category is assigned if a smile has not been detected on the user's face. Alternatively, the facial expression may be more classified into a broader range of categories, such as happiness, sadness, despair, disgust, love, etc. and further classified using a range of values for these categories, such as for example strongly positive, somewhat positive, neutral and somewhat negative, and strongly negative. As a result of facial recognition, images in the positive category are then considered to be a user's favorite images, while images in the not positive category are not considered to be the user's favorite images.

The longer the image viewing time, the higher probability of positive image importance for that particular image. In blocks 126-134, the user views images, one at a time, on the monitor 14 and proceeds to the next image by clicking the mouse button. The time interval between two consecutive images is determined by a home computer 10 and recorded as an affective signal. The paper entitled "Looking at pictures: Affective, facial, visceral, and behavioral reactions", *Psychophysiology*, 30, pp. 261-273, 1993, by P. J. Lang, M. K. Greenwald, M. M. Bradley, and A. O. Hamm, reports that on average, viewing time linearly correlates with the degree of the interest or attention an image elicits in an observer. This paper compares the viewing time with the degree of the interest for third party pictures. In the present invention, the viewing time information is assessed for one or more users, for first party images.

The relationship between viewing time and user interest is used by the home computer 10, which interprets the viewing time as an indication of the user's interest toward an image, or as a degree of importance of the image. The relative degree of interest for a specific image is determined as the viewing time for this specific image divided (or normalized) by the maximum viewing time among all images of the set. This relative degree of interest is used by the home computer 10 to rank the images in the set in a systematic and continuous manner, as "important" or "favorite" images. The most favorite images are those that have higher relative degrees of interest for a specified user.

To ensure that the viewing time is not improperly judged as a result of user distraction, the video camera 4 can be used to ensure that the user 2 is directing their gaze towards the monitor 14, and is not distracted by other tasks, or has even left the room.

Skin conductance is a magnitude of the electrical conductance of the skin that is measured as a response to viewing the image. This signal is recorded using a biometric sensor. A computer mouse that is able to detect and record skin conductance has been developed by IBM Corp. Skin conductance or galvanic skin response reflects a degree of interest toward the picture as described in a paper entitled "Looking at pictures: Affective, facial, visceral, and behavioral reactions", *Psychophysiology*, 30, pp. 261-273, 1993, by P. J. Lang, M. K. Greenwald, M. M. Bradley, and A. O. Hamm. The skin conductance changes depending on the arousal the image elicits in the viewer: the higher the skin conductance, the higher the arousal or excitement, and vice versa; the lower the skin conductance, the lower the arousal. Therefore, the measure of the amplitude of the skin conductance response which is the difference between skin conductance before an image onset and the extremum of the skin conductance developed within a few seconds after an image onset, can be used to determine the user's interest or attention to a certain image.

Based on the skin conductance recorded using the pointing device 18, every image of the set is assigned a degree of interest. The value is a function of the magnitude of the skin conductance for the particular image, divided by the maximum skin conductance response recorded for the image set. The images in the set can be ranked as favorite images by using these values. The lower relative skin conductance, the more "favorite" the image is.

The three affective signals can be further combined to obtain an integral measure of positive interest. For every image in the set, the relative degrees of interest are obtained based on the viewing time (degree of interest via viewing time, DItime) and the skin conductance response (degree of interest via skin conductance response, DIskin_response) as described above. If an image was classified as positive based on the assessment of facial expression, the image is assigned a value of 1 for positive response (PR). If an image was classified as not positive, a value of 0 is assigned for positive response. Then a measure of positive interest (e.g. importance or "favoriteness") can be computed for every image using an appropriate function. One such function is a sum of all three measures:

Positive Interest=DItime+DIskin_response+PR.

Other appropriate functions include a weighted sum of these three measures, where the weights are determined based on the standard deviation within each of the normalized (divided by the maximum value) signals over the image set. In this case, the higher the standard deviation within the signal, the higher the weight of the contribution for the signal into the measure of positive interest. Consequently, the lower the standard deviation of a given signal, the lower the weight of the contribution for the corresponding signal into the measure of positive interest. The reason for this dependency stems from the assumption that a standard deviation of a particular measure reflects a degree of differentiation between the images along a given measure. This implies that the signal with the highest standard deviation has more differentiation power, and therefor is more important to consider while determining an integral measure of positive interest.

In block 140, if the user selected manual affective tagging in block 118, the images in the image set are displayed on the monitor 14 as small thumbnail images. In block 142, the user manually selects images, which are favorites, and enters manually affective information (e.g. degree of positive importance/favorite) for the selected images. This may be done using the methods described in commonly assigned U.S. Pat. No. 6,629,104, the disclosure of which is incorporated herein by reference.

In block 146, the affective information from block 136 or 142 is used to provide personal affective tags, which are associated with the corresponding images of the image set. The association can be accomplished by including the personal affective tags within each image file of the set or by providing the personal affective tags in a separate database, along with a name or pointer to the corresponding image associated with each tag. The database can be stored on hard drive 20. The personal affective tag includes a user identifier, as described earlier in relation to block 114.

An illustrative example of a personal affective tag is shown in FIG. 4A. FIG. 4A depicts a file data structure of a personal affective tag for a single user, which includes a personal identification field, two affective records captured at two different times, and one behavior record.

The personal affective tag field identifies the data structure in the file as containing personal affective tag data. A personal identification code is stored in the personal identification field. This field identifies the user, whose affective information is stored in this personal affective tag.

The affective records stores affective information directly related to a user's reaction to an image. This includes the date and the place the affective information was collected. The first affective record stores affective information captured at a first time and location specified in the first Location field and Time field, and the second affective record stores affective information captured at a second time and location specified in the second Location field and Time field. The affect field in the affective record stores the subjective reaction(s) determined when the image was viewed by the user identified by personal identification code stored in the personal identification field. In the simple embodiment, the affect field can store an "importance" or "favorite" ranking ranging from −10 to 10, where 10 means the most favorite and −10 means the least favorite. Alternatively, the affect field can include basic emotion (e.g. happy) with a corresponding ranking that quantifies the intensity of the detected emotion. The affect determination can be the result of automatic detection or a manual entry by the user, as described earlier in relation to FIG. 2.

The minimum required information contained in a personal affective tag consists of the personal identification code stored in the corresponding field, and at least one subjective reaction (affect) stored in the affect field. Other optional fields shown in FIG. 4A include the time the affective information was collected, stored in the Time field. The personal affective tag can also contain other affective data related to the affective signals selected by the user in step 122. These fields can include the viewing time field, physiology temperature field, physiology heart rate field, physiology EEG field, face expression field, the gaze tracking field, and the touch pressure field.

The behavior record stores information related to the usage of the image, including the number of times the image was viewed by the user, the number of times the image was printed by the user, and the number of times the image was sent by e-mail by the user.

Referring to FIG. 4B, there is shown an example data structure of affective metadata for a single image, which provides personal affective information for multiple users. Personal affective tag 1 indicates that on Aug. 1, 2000, a first user (user 1) provided affective information (either manually or automatically) which gave the associated image an importance rating of 8 (on a −10 to 10 scale). Personal affective tag 2 indicates that on Jul. 4, 2001, a different user (user 2) provided affective information, which gave the same associated image an importance rating of 4. Personal affective tag 3 indicates that on Oct. 8, 2001, the first user (user 1) provided affective information, which now gave the same associated image an importance rating of −5.

Figure 4C:
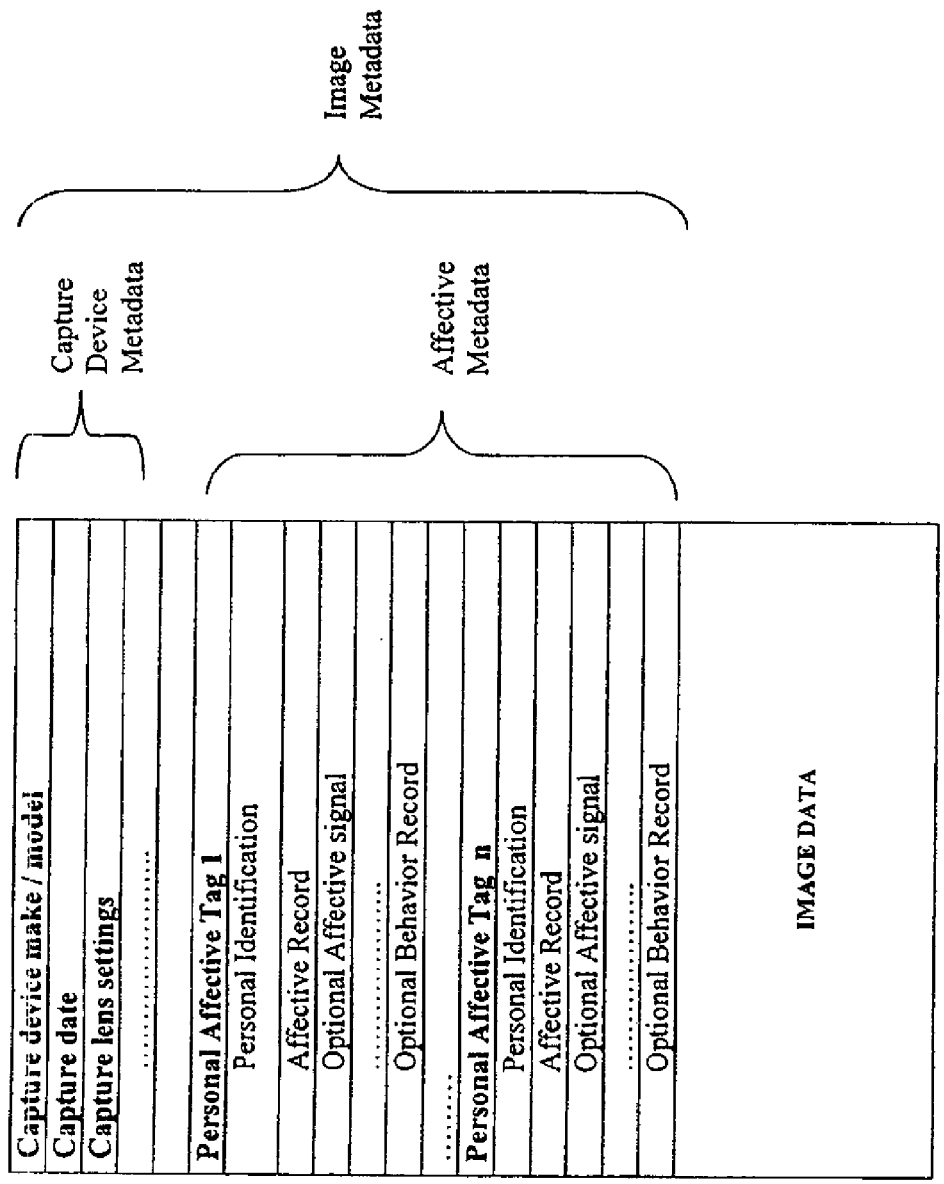
FIG. 4C depicts an image file including affective metadata.

Referring to FIG. 4C, there is shown an example of an image file, which contains image metadata and image data. The image file can be a JPEG image files, such as an Exif/JPEG file, a TIFF file, a JPEG 2000 image file, or can utilize many other image file formats. The image metadata includes well known capture device metadata. This capture device metadata can include the make of the digital capture device that provided the image, for example the make of the digital camera. It can also include the image capture date and capture device settings, such as the camera lens focal length, f-number, etc. In accordance with a preferred embodiment of the present invention, the image metadata includes one or more personal affective tags. Each personal affective tag includes a user identifier stored in a personal identification field, and at least one Affective Record, such as an importance rating. A single image file can include a plurality of affective tags for a plurality of different users.

Figure 5:
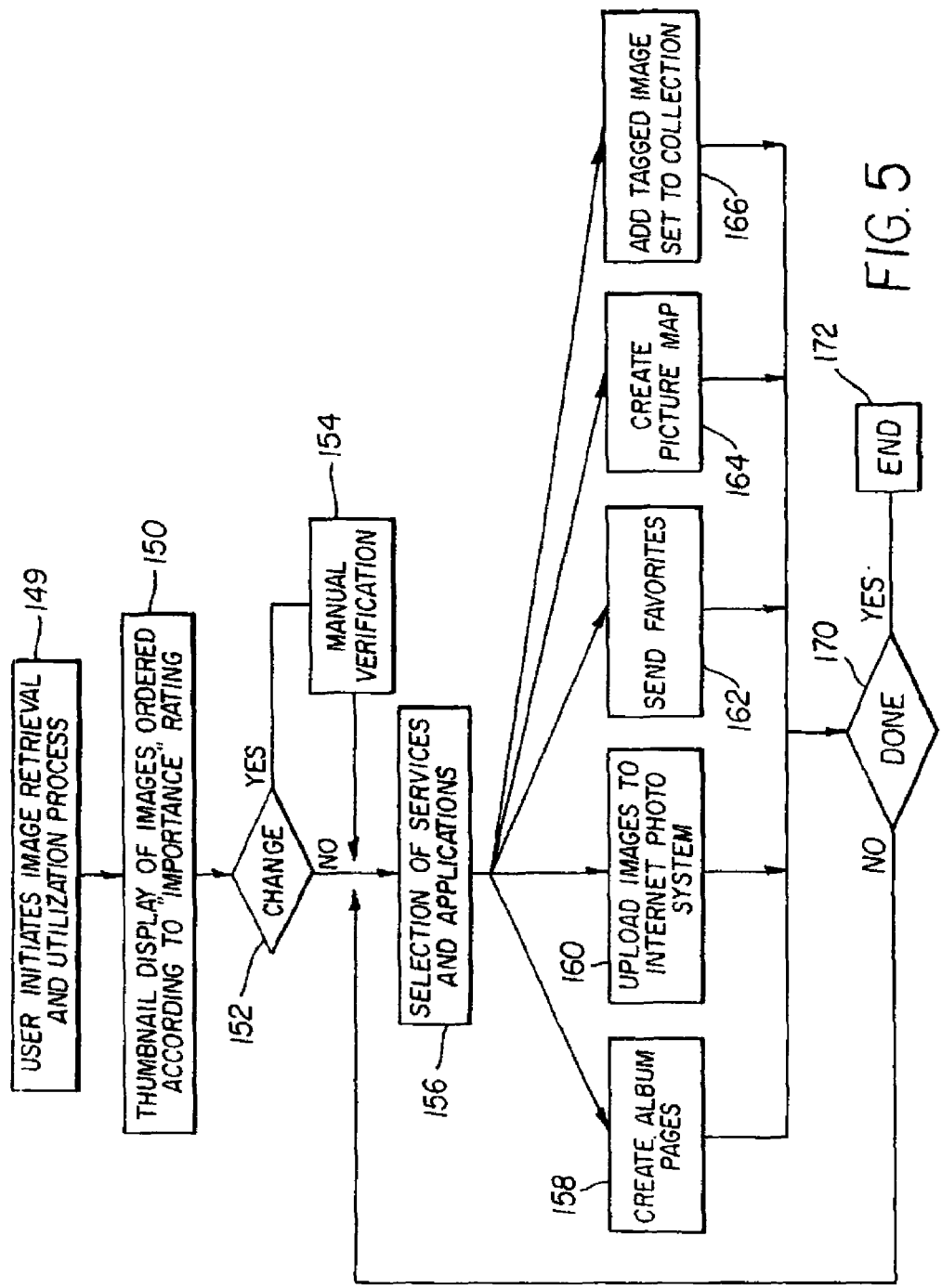
FIG. 5 is a flow diagram of a typical method for using affective information in a digital imaging system.

In block 148 of FIG. 2, the personal affective tags are used to retrieve or print images. Referring to FIG. 5, there is shown a flow diagram of an exemplary embodiment of the present invention of a retrieval system on the home computer 10. In this embodiment, the personal affective information is used to assist in the image retrieval process, and is used to improve the process of providing photoproducts, such as album pages, which utilize the set of images described earlier in relation to block 110. It will be understood that the image retrieval can be done immediately after the personal affective information is created, or at a later time. It will also be understood that prior to image retrieval, other users may have provided affective information for the same set of images, so that each image has associated affective information for a plurality of users. If the image retrieval is done at a later time, the user is asked to enter their personal ID and password, as described earlier in relation to block 112. This is done so that the appropriate user identifier can be used to retrieve the appropriate personal affective information for the user.

In block 149 of FIG. 5, the retrieval user initiates the image retrieval and utilization process, by selecting, using the pointing device 18, an appropriate menu item (such as a menu item named "retrieve images") displayed on monitor 14.

In block 150, the home computer 10 provides a thumbnail display of the set of images on the monitor 14. The thumbnails are ordered according to "importance" rating of the images for the particular user. The higher rated images are displayed first, and the lowest rated images are displayed last. The rating can also be displayed alongside each associated image. As a result, the user's personal affective information is used to determine the order of presentation of the retrieved images.

In block 152, the user is asked if they want to change the ratings. If the user responses in the affirmative, in block 154 the user can manually adjust the rating. The home computer 10 stores new personal affective information for the user, for each image whose rating is manually adjusted.

In block 156, the user selects one or more services and applications of interest. These can include creating customized album pages (block 158), uploading images or album pages to the service provider 40 for printing (block 160), sending favorite images by e-mail (block 162), creating a picture map (block 164), and adding the image set (including the associated personal affective tags) to a user's collection on the local hard drive 20, or on a remote server (step 166), for sharing with family and friends via the Internet.

In block 170, the user is asked if they are done, or if they want to select additional services or products. In block 172, the process ends.

Figure 6:
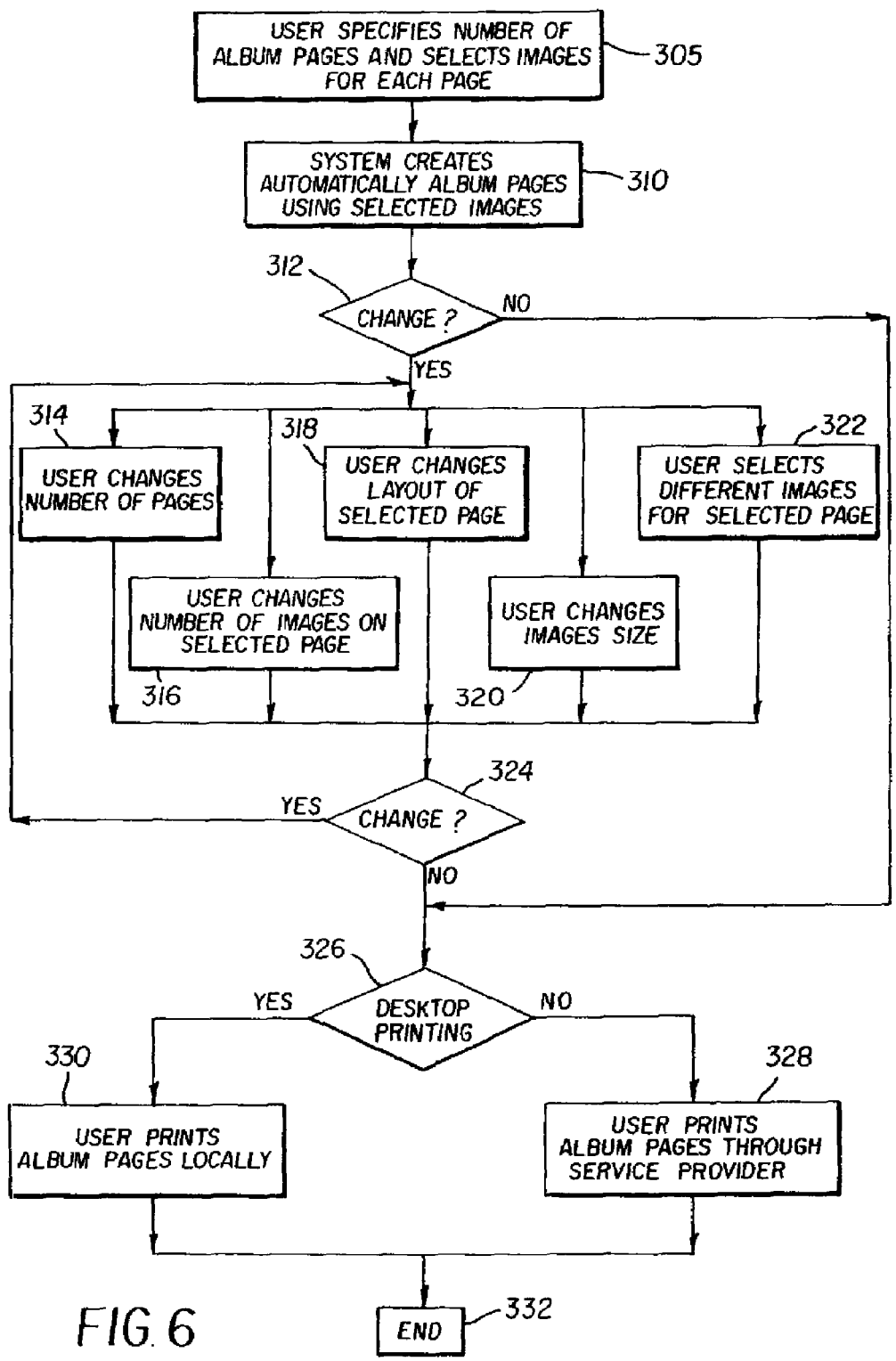
FIG. 6 depicts a flow diagram for creating album pages.

FIG. 6 is a flow diagram of an exemplary embodiment of the present invention of a system for creating album pages that uses affective information. Affective information can be used by the system to create album pages in the following ways:

to retrieve favorite images to be included on album pages;
to position most favorite images in the center of the page;
to resize most favorite images to be bigger than other images on the page; and
to change the background surround the most favorite images to emphasize their importance (e.g. providing a bold framing feature).

The flow diagram in FIG. 6 describes in more detail the process of creating album pages, which is block 158 in FIG. 5. In block 305 of FIG. 6, the user specifies the number of album pages, and selects images for each album page. In an alternative embodiment, the system can automatically select images for each page by using the capture date information, stored in image metadata, and the number of pages specified by the user, to group the images on pages according to the date.

In block 310, the system automatically creates the specified number of album pages from the selected images. In a preferred embodiment of the present invention, the images are automatically organized into album pages using emphasis images, as described in commonly assigned U.S. patent application Ser. No. 09/559,478, filed Apr. 27, 2000 by Simon, the disclosure of which is incorporated herein by reference. In the present invention, the most favorite images are automatically identified as emphasis images. As described in the Simon et al. patent, the emphasis image is located in the center of the page and is larger than other images on the page. This method of emphasizing the most important images can be repeated for each album page, to create specified number of album pages.

After the album pages are automatically arranged, in block 310, the user is asked whether they want to modify the arrangement, in block 312. The user can then change the number of pages (block 314), the number of images on a selected page (block 316), the layout of the selected page (block 318), and the size of images on the page (block 320). The user can also select different images to include on the pages (block 322). When the user is satisfied with the appearance of the album pages (block 324), then user then decides (block 326) whether to print the album pages locally (block 330) or to instead order printed album pages from the service provider 40 (block 328). The album pages can be produced using the methods described in commonly assigned U.S. Pat. No. 6,004,061 to Manico et al., the disclosure of which is herein incorporated by reference. The process ends at block 332.

Figure 7A:
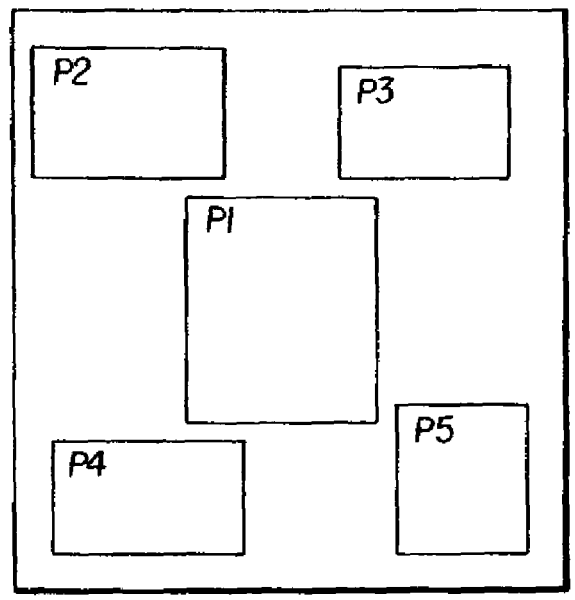
FIG. 7A depicts a customized album page produced using affective information.

Referring to FIG. 7A, there is shown an example of a created album page. Five images (P1-P5) are formatted and put on the album page by the home computer 10, or by the service provider 40. When the system automatically creates an album page, the most favorite image is featured. This can be done by positioning this most favorite image in the center of the page (image P1). This can also be done by formatting the most favorite image (P1) so that this image is larger in size than the other images on the page. This can also be done by providing a background frame, or another type of background surround, that draws attention to this particular image. In addition, image attributes of the most favorite image can be modified to emphasize its importance. For example, this image can be processed to increase its sharpness, color saturation, etc.

The most favorite image is automatically selected from the set of images assigned for the album page, based on the personal affective information associated with images for the particular user. If a second user, having different personal affective information, were to request an album page including the same set of images, it is likely that a different image would be featured, since a different image is likely to be the most favorite image for that second user. Thus, album page layout is automatically customized for the particular user, based on the personal affective information for that user.

Figure 7B:
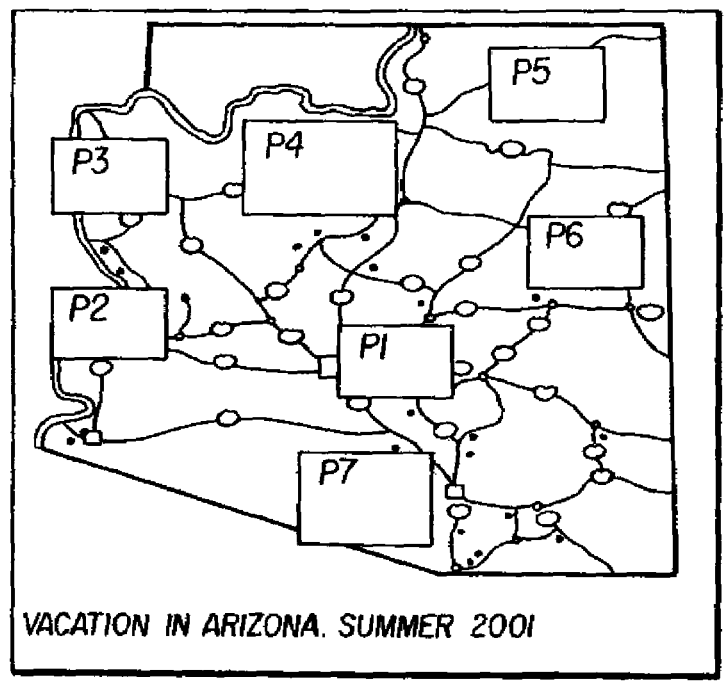
FIG. 7B depicts a picture map produced using affective information.

Referring to FIG. 7B, there is shown an example of a picture map created in block 166 of FIG. 5. In this example, seven images (P1-P7) are formatted and put on the picture map. In one exemplary embodiment, the system can automatically select an appropriate map based on geographic location information stored as metadata associated with the images. Such metadata can be created automatically at capture time (e.g. by the digital cameras with GPS—Global Positioning System) or manually by the user. For each different location specified by the metadata, the system selects the most favorite image captured in that location and places it in the proper place on the map. The most favorite images are automatically selected by the system based on the personal affective information associated with the images. In FIG. 7B, seven locations have been identified, and the seven most favorite images (P1-P7) corresponding to these locations have been selected and placed on the map.

Figure 9:
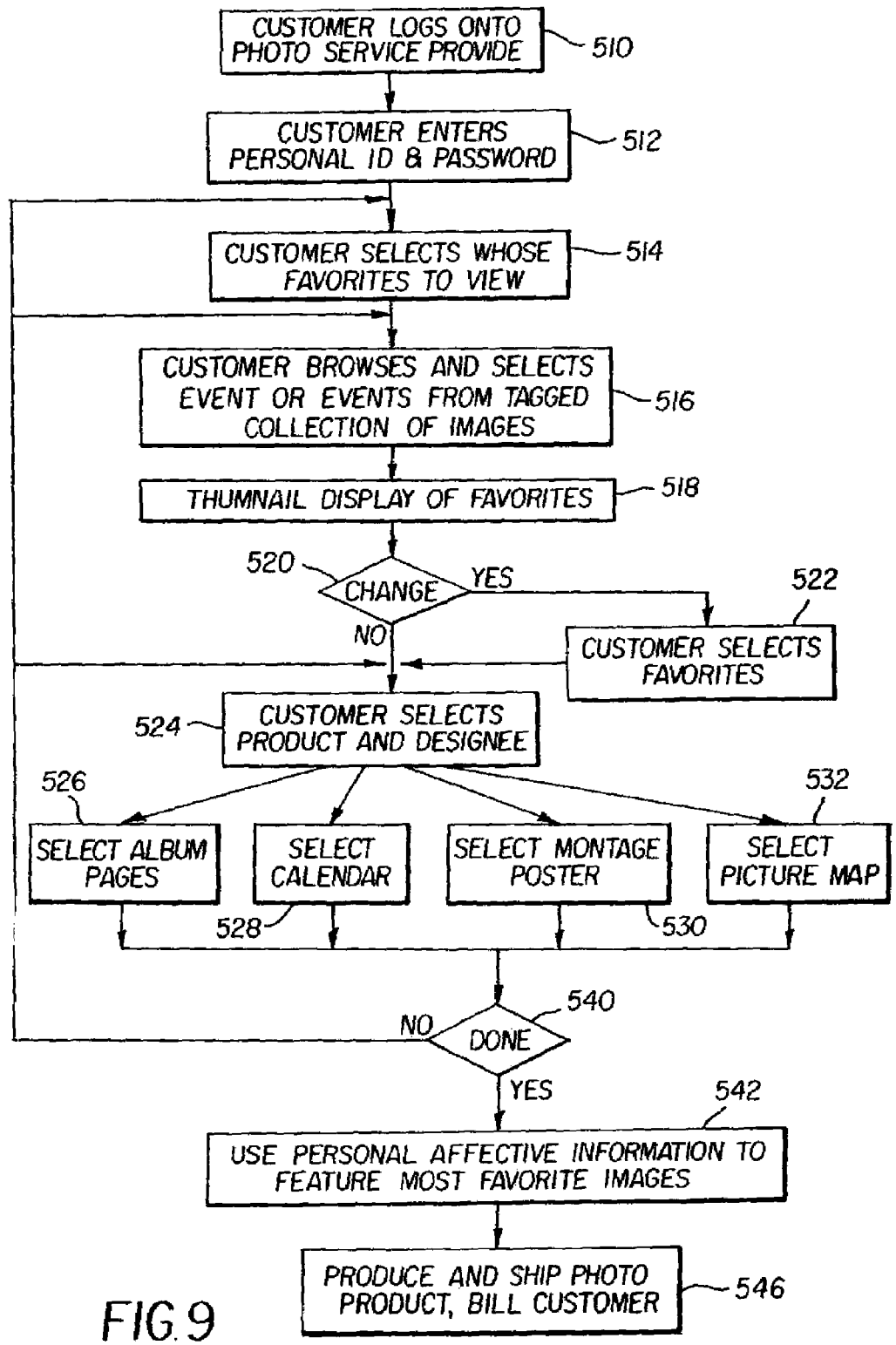
FIG. 9 depicts a flow diagram for creating customized photo-products using a service provider for a designee.

Referring to FIG. 9, there is shown a flow diagram of an exemplary embodiment of the present invention of using affective information to create customized photoproducts through a communications network, such as the Internet. In the present invention, customized photoproducts, such as album pages, are created based on personal affective information associated with the images.

In block 510, the customer logs onto a web site provided by the photo service provider 40 (FIG. 8). In general, the customer may not be the same person as the user who created the affective information in FIG. 2. For example, this is the case when one family member creates personalized photoproducts for other family members or friends using their favorite images.

In block 512, the customer enters their personal ID and password, as described earlier in relation to block 114 of FIG. 2.

In block 514, the customer selects whose favorite images they want to browse. The customer can choose to browse through their favorites, and/or through favorite images provide by their family members or friends. To browse through other people's favorite images, the customer must have access permission, as described in commonly assigned U.S. Pat. No. 5,760,917 to Sheridan, referenced earlier. These access permissions are created when images are uploaded and stored by a user in database 44.

In block 516, the customer browses through favorites by date and/or event and selects images of interest (e.g. by clicking on images to be selected). In block 518, thumbnails of all selected images are displayed. In block 520 and 522, the customer can modify their selection of images.

In block 524, the customer selects one or more desired products, and the designee who is to receive the product. If the user has access permission for the designee, the service provider can automatically determine the user identifier for the designee, so that personal affective information for the designee can be used to customize the photoproduct to be order and shipped to that designee, for example as a gift.

Using the customer selected images, different customized photoproducts can be created. In block 526, album pages can be selected. In block 528, a customized calendar including customer selected images can be selected. In block 530, a montage poster can be selected. This is a large poster containing a creative background and many different images. In block 532, the customer can choose to create a picture map. In block 540, the customer decides whether they are done selecting photoproducts, or want to select additional photoproducts.

In block 542, the personal affective information for the designee is used to feature the most favorite images, as the photoproduct is organized. As described earlier in reference to FIG. 5, when album pages, calendars, or montage posters are created, the personal affective information is used to select one or more particularly favorite images to be featured. These featured images are printed larger than the others are, and in more prominent locations in the photoproduct.

In block 546, the photoproduct is produced and shipped to the customer's designee, and the customer is billed by the service provider.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

The invention has been described in detail with particular reference to certain preferred embodiments thereof, but it will be understood that variations and modifications can be effected within the spirit and scope of the invention.

PARTS LIST 2 user
4 video camera
10A-D home computer systems
12 CPU motherboard
14 monitor
16 keyboard
18 pointing device with physiology sensors
20 hard drive
22 modem 24 digital camera
26 CD reader
28 scanner
30A-C Internet service provider
32 modems
34 computers/routers
36 channel
37 PDAs
38 retail kiosks
39 electronic picture frame device
40 service provider
42 Internet server
44 electronic database
46 billing system
48 bill issuing
52 production controller
54 hardcopy printers
56 album pages
70 shipping system
72 shipping label printer
74 shipping label
110 block
112 block
114 block
118 block
120 block
122 block
124 block
126 block
128 block
130 block
132 block
134 block
136 block
140 block
142 block
146 block
148 block
149 block
150 block
152 block
154 block
156 block
158 block
160 block
162 block
164 block
166 block
170 block
172 block
305 block
310 block
312 block
314 block
316 block
318 block
320 block
322 block
324 block
326 block
328 block
330 block
332 block
510 block
512 block
514 block
516 block
518 block
520 block
522 block
524 block
526 block
528 block
530 block
532 block
540 block
542 block
546 block

The invention claimed is:

1. A storage device comprising a non-transitory digital image file for storing a still digital image and metadata related to the still digital image, the non-transitory digital image file comprising:
   a) non-transitory digital image data representing the still digital image; and
   b) first metadata manually entered by a first user and second metadata manually entered by a second user, the first and second metadata for identifying a relative importance of the still digital image to the first and second users, wherein the first and second metadata includes one of at least three different integer values for identifying the relative importance and which is stored in association with the non-transitory digital image file, and wherein the first and second metadata are accessed by a computer system for automatically selecting or not selecting the digital still image based on the one of at least three different integer values.

2. The image file of claim 1 wherein the first and second metadata further specifies the time or period within a range of times that the metadata was entered.

3. The image file of claim 1 wherein the first and second metadata further identifies a the first and second user, respectively.

4. The image file of claim 1 wherein the first and second metadata further includes information identifying a type of device that captured the still digital image.

5. The image file of claim 1 wherein the image file is an Exif image file.

6. The image file of claim 1 wherein the first and second metadata includes affective information and wherein the affective information is manually entered through a user interface which enables the user to indicate important images.

7. A computer system comprising:
   storage including a non-transitory digital image, first metadata associated with the digital image, and second metadata associated with the digital image, the first metadata further associated with a first user and the second metadata further associated with a second user, the first metadata and the second metadata each including one of a range of values for identifying a relative importance of the digital image to the first user and the second user, respectively, the first and second metadata accessible by the computer system for automatically selecting or not selecting the digital image for each of the first user and the second user in response to the one of a range of values included in the first metadata and in the second metadata.

8. The computer system of claim 7, wherein the storage further includes a plurality of additional non-transitory digital images, additional first metadata associated with each of the plurality of additional digital images, and additional second metadata associated with each of the plurality of additional digital images, the additional first metadata further associated with the first user and the additional second metadata further associated with the second user, the additional first metadata and the additional second metadata each including one of a range of values for identifying a relative importance of the plurality of additional digital images to the first user and the second user, respectively, the additional first and second metadata accessible by the computer system for automatically selecting or not selecting each of the plurality of additional digital images for each of the first user and the second user in response to the one of a range of values included in the additional first metadata and in the additional second metadata.

* * * * *